(12) United States Patent
Manzalini (10) Patent No.: US 12,536,917 B2
(45) Date of Patent: Jan. 27, 2026

(54) TRACKING A MOVING ENTITY (71) Applicant: Telecom Italia S.p.A., Milan (IT)

(72) Inventor: Antonio Manzalini, Turin (IT)

(73) Assignee: Telecom Italia S.p.A., Milan (IT)

( * ) Notice: Subject to any disclaimer, the term of this patent is extended or adjusted under 35 U.S.C. 154(b) by 150 days.

(21) Appl. No.: 18/269,811

(22) PCT Filed: Dec. 23, 2021

(86) PCT No.: PCT/EP2021/087572
§ 371 (c)(1),
(2) Date: Jun. 27, 2023

(87) PCT Pub. No.: WO2022/144313
PCT Pub. Date: Jul. 7, 2022

(65) Prior Publication Data
US 2024/0321122 A1    Sep. 26, 2024

(30) Foreign Application Priority Data
Dec. 29, 2020    (IT) .................. 102020000032606

(51) Int. Cl.
*G08G 5/00*    (2025.01)
*G01S 5/02*    (2010.01)
(Continued)

(52) U.S. Cl.
CPC .............. *G08G 5/55* (2025.01); *G01S 5/0294* (2013.01); *G08G 5/34* (2025.01); *G08G 5/57* (2025.01); *G08G 5/58* (2025.01); *G01S 2205/005* (2013.01)

(58) Field of Classification Search
CPC .. G08G 5/55; G08G 5/34; G08G 5/57; G08G 5/58; G01S 5/0294; G01S 2205/005;
(Continued)

(56) References Cited

U.S. PATENT DOCUMENTS 9,847,033 B1 * 12/2017 Carmack .......... G06Q 10/08355
11,810,365 B1 * 11/2023 Crego .................... G06V 20/58
(Continued)

FOREIGN PATENT DOCUMENTS

CN    117197695 A  *  12/2023

OTHER PUBLICATIONS

Apr. 13, 2022—(WO) ISR and Written Opinion—App PCT/EP2021/087572.

(Continued)

*Primary Examiner* — Peter D Nolan
*Assistant Examiner* — Peter Y Ning
(74) *Attorney, Agent, or Firm* — Banner & Witcoff, Ltd.

(57) ABSTRACT

A tracking system for tracking the movement of a moving entity is provided. The tracking system comprises a tracking device configured to move together with the moving entity and provide data associated with the movement of the moving entity, and a detection module configured to, on the basis of the data associated with the movement of the moving entity, perform a detection process to detect an anomaly in the data, the detection process comprising a machine learning algorithm. The tracking system is further configured to, in case the anomaly is detected, issue an alert message to be processed at a control station.

20 Claims, 4 Drawing Sheets

(51) Int. Cl.
  *G08G 5/34* (2025.01)
  *G08G 5/55* (2025.01)
  *G08G 5/57* (2025.01)
  *G08G 5/58* (2025.01)

(58) Field of Classification Search
  CPC ............ H10F 77/1692; H10D 1/048; H10D 84/0126; H10D 84/977; G06N 3/045; G06N 3/082; H04W 4/029; H04W 4/44; H10H 29/922
  See application file for complete search history.

(56) References Cited

U.S. PATENT DOCUMENTS

| | | | |
|---|---|---|---|
| 2008/0133135 A1* | 6/2008 | DiEsposti | B64G 3/00 701/13 |
| 2019/0207959 A1* | 7/2019 | Winkle | G08G 5/59 |
| 2022/0121878 A1* | 4/2022 | Butler | G06V 10/774 |
| 2022/0126864 A1* | 4/2022 | Moustafa | B60W 60/0013 |

OTHER PUBLICATIONS

Molina, N., et al.. (May 2018), "A wireless method for drone identification and monitoring using AIS technology", in 2018 2nd URSI Atlantic Radio Science Meeting (AT-RASC) (pp. 1-2).

* cited by examiner

TRACKING A MOVING ENTITY

TECHNICAL FIELD

The present invention relates to the field of traffic control devices and systems for moving entities. In particular, the present invention relates to the field of devices, systems and methods for tracking a moving entity, in particular a moving object such as, for example, a land, water, air or space vehicle.

BACKGROUND ART

Over the past recent years, there has been a large diffusion of Unmanned Aerial Vehicles (UAVs), such as flying drones, in many commercial, researching and entertainment applications. The use of a growing number of drones for multiple applications has raised the attention of governments in order to define laws and regulations for an adequate usage, mainly in terms of security and terrorism. Among these laws, it is mandatory that all drones are identified and monitored all the time.

It is expected that there will be also a rapid increase of unmanned vessels and autonomous ships in the maritime transport. In particular, in the maritime context, AIS (Automatic Identification System) is used for traffic monitoring and collision avoidance. Nowadays AIS is a mandatory installation for vessels having a gross tonnage of at least 300 (which is a unitless index related to a ship's overall internal volume), and for all passenger ships, regardless of their size, since 2002. AIS works by acquiring GPS coordinates and exchanging, via dedicated radio transmissions, information between ships and maritime authorities located onshore. This information mainly includes the ship's identification, type, position, course, speed. The information can be displayed on a screen and used by the pilot system to provide an alarm in the event a collision is foreseen. The transmitted data also allow maritime authorities to monitor the ship movements.

AIS information is broadcasted, collected and exchanged regularly with a time period varying from a couple of seconds to minutes, depending on the type of information and conditions of the AIS systems present in the related AIS stations. Stations collecting and sharing data are located in vessels, lighthouses, buoys, AIS gateways and at locations of port authorities offering Vessel Traffic Services (VTS). An AIS gateway typically broadcasts the coordinates sent by the vessels. There are also AIS Providers (namely, consortia of partners having AIS stations) which are also collecting AIS data and offering-over the Internet-free or paid information services to support the navigation. VesselFinder is an example of AIS Provider (https://www.vesselfinder.com/).

AIS supports a communication protocol that allows the transmission of information, including the name, speed and/or course of the vessel. In particular, any vessel that transmits AIS messages must be registered with a unique number named MMSI (Maritime Mobile Service Identity), assigned by a national maritime authority, and the NMEA (National Marine Electronics Association) protocol is used to provide an AIS message format.

The concept of AIS can be extended and used also for tracking the positioning of drones. For instance, Molina, N., Cabrera, F., Araña, V., Tichavska, M., Dorta, B. P., & Godoy, J. A. (2018 May), "A wireless method for drone identification and monitoring using AIS technology", in 2018 2nd URSI Atlantic Radio Science Meeting (AT-RASC) (pp. 1-2). IEEE, provides an example block diagram of an AIS designed to send drone parameters with the typical AIS message format.

SUMMARY OF THE INVENTION

In the maritime transport, AIS transmitters are used to broadcast AIS data while AIS receivers are often used to accept and share any data they receive from any AIS transmitter, without filtering and control. The communication between AIS transmitters and AIS receivers is typically performed over dedicated radio links. The current system has several security issues. Among the possible threats, examples of actions an attacker may pursue are the following: disabling AIS communications, tampering with existing AIS data (for example to modify the information broadcast by a ship), triggering search and rescue alerts in order to lure a victim ship into navigating to a hostile and attacker-controlled sea space, or spoofing a collision in order to possibly bring a ship off course.

Moreover, a malicious actor can perform direct attacks with RF connections in an open-air environment like onshore or open sea, targeting real vessels and authorities.

As mentioned, positioning coordinates are typically provided by a Global Navigation Satellite System (GNSS). Examples of GNSS are the GPS, the Russian GLONASS, the European Galileo, the Chinese BeiDou, the Japanese QZSS and the Indian INRSS/NAVIC. An alternative approach to GNSS to acquire positioning coordinates is to use a so-called RPS (Radio Positioning System) based on a mobile network (e.g. LTE-Long Term Evolution, or 5G). However, also in case of adoption of this alternative approach, the above mentioned security threats persist.

The Applicant has tackled the problem of providing a system, a device and a method for tracking a moving entity (e.g., ship, vessel, drone, unmanned vehicle, aircraft, etc.) which allows improving the tracking reliability and security with respect to AIS or any other tracking technology similar to AIS like for example ADS-B (Automatic Dependent Surveillance Broadcast designed to track aircraft) in order to reduce any data loss and data corruption due to unauthorized access and hijacking.

In the present description and in the claims, the expression "moving entity" will refer to any entity that is changing its position in a considered scenario. According to the present invention, the expression "moving entities" may relate to moving objects such as ships, vessels, drones, unmanned vehicles, aircrafts, trains, cars, etc., but also to moving beings, such as humans and animals.

According to a first aspect, the present invention provides a tracking system for tracking the movement of a moving entity, the tracking system comprising:
 a tracking device configured to move together with the moving entity and provide data associated with the movement of the moving entity; and
 a detection module configured to, on the basis of the data associated with the movement of the moving entity, perform a detection process to detect an anomaly in the data, the detection process comprising a machine learning algorithm;
 wherein the tracking system is further configured to, in case the anomaly is detected, issue an alert message to be processed at a control station.

Preferably, the machine learning algorithm is a supervised learning algorithm. More preferably, the supervised learning algorithm is based on a 1D convolutional neural network.

Preferably, the tracking device comprises a communication module configured to transmit and receive a signal to/from a global navigation satellite system, and to determine actual position coordinates of the moving entity from the signal received from the global navigation satellite system.

Alternatively, the tracking device comprises a communication module configured to determine actual position coordinates of the moving entity from a signal received from a radio positioning system based on a mobile communication network.

According to embodiments of the invention, the communication module of the tracking device is configured to receive the signal in an encrypted form and the tracking device is configured to implement a cryptographic method to decrypt the encrypted signal.

Preferably, the cryptographic method is a quantum key distribution algorithm or a method based on a quantum random number generator.

Preferably, the tracking device further comprises a subscriber identity module storing at least one SIM identifier for the device identification when establishing a connectivity with a mobile communication network.

Preferably, the tracking device further comprises a controller configured to manage one or more sensors and/or one or more actuators on board the moving entity.

Preferably, the controller is configured to process a command for managing at least one actuator for adjusting the route of the moving entity.

Preferably, the tracking device is implemented as a microcomputing unit on board the moving entity.

According to a second aspect, the present invention provides a tracking device for tracking the movement of a moving entity, the tracking device being configured to move together with the moving entity and comprising:
- a first processing module configured to, on the basis of data associated with the movement of the moving entity, perform a detection process to detect an anomaly in the data;
- a second processing module configured to, in case the anomaly is detected, issue an alert message; and
- a communication module configured to connect the tracking device with a mobile communication network and to send the alert message, via the mobile communication network, to a control station,
wherein the detection process comprises a machine learning algorithm.

According to a third aspect, the present invention provides a method for tracking the movement of a moving entity, the method comprising, at a tracking system comprising a tracking device configured to move together with the moving entity:
a) providing data associated with the movement of the moving entity;
b) performing a detection process to detect an anomaly in the data, the detection process comprising a machine learning algorithm; and
c) in case the anomaly is detected, issuing an alert message to be processed at a control station.

Preferably, the machine learning algorithm is a supervised learning algorithm and performing a detection algorithm comprises training the detection algorithm based on a set of error data that are computed as a difference between an actual position of the moving entity and an expected position of the moving entity.

Preferably, the set of error data comprises a number of arrays of error data, each array being derived from a computation of the error data within a time window of pre-defined duration, and wherein, during each time window, the computation of the difference between the actual position and the expected position is performed at discrete sampling times with a given frequency.

Preferably, performing a detection algorithm comprises labelling each array of error data by associating it with a given class indicating a type of behavior of the moving entity in the considered time window, wherein one type of behavior indicates an anomaly in the behavior of the moving entity.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
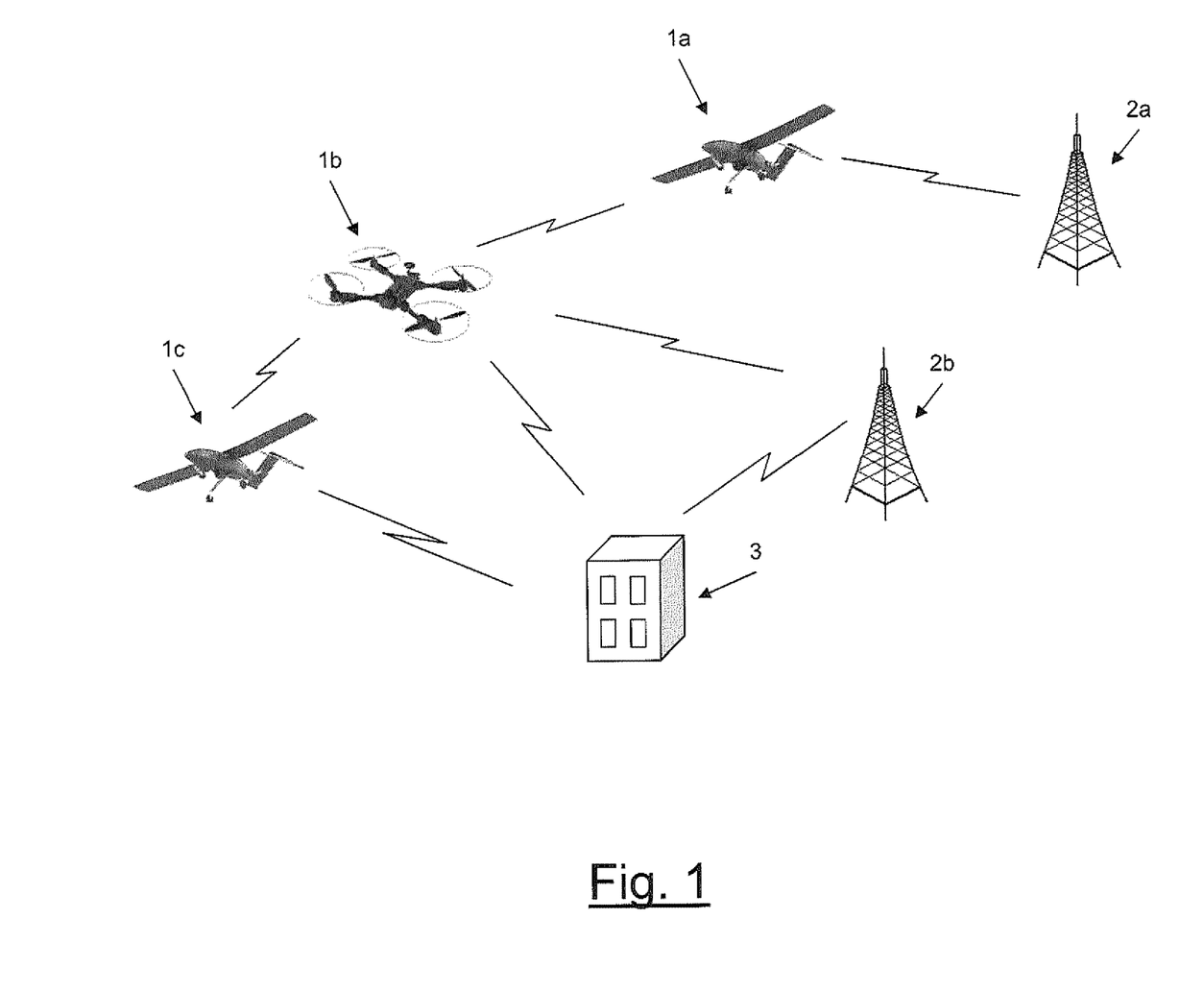
FIG. 1 schematically illustrates an exemplary scenario of application of the present invention.

FIG. 1 schematically shows an exemplary scenario of application of the present invention.

In particular, FIG. 1 shows a number of moving objects in the form of, for sake of example, unmanned aerial vehicles (UAVs) 1a, 1b, 1c. This is not limiting since the present invention can be applied to any other type of moving entity according to the definition given above.

FIG. 1 also shows a number of base stations 2a, 2b of a mobile communication network and a control station 3. The scenario represented in FIG. 1 may also comprise a number of satellites (not shown) preferably forming part of a Global Navigation Satellite System (GNSS) such as the Global Positioning System (GPS). Moreover, the scenario of FIG. 1 may comprise a number of gateways (not shown in FIG. 1) interconnecting a tracking device associated with a UAV according to the present invention with one or more data networks (e.g. the Internet), a cloud and/or a number of service providers. The gateways are configured to forward data between the tracking device and these entities. One or more gateways may also be interposed between the tracking devices associated with the UAVs and the control station. In a scenario of maritime transport, where the tracking device of the present invention may be associated with a vessel, the gateways may be located along coast lines and in vessel traffic services (VTS) operated by port authorities.

The UAVs 1a, 1b, 1c and the control station 3 are preferably interconnected through the mobile communication network, via the base stations 2a, 2b. The mobile communication network is, for instance, an LTE (Long Term Evolution) or a 4G/5G communication network. It is to be noticed that the gateways mentioned above may be associated with the base stations 2a, 3b of the mobile communication network.

The control station 3 may be provisioned by a centralized authority in charge of monitoring the movements of the UAVs 1a, 1b, 1c and taking adequate actions in case of an anomaly detection. The control station 3 is preferably configured to collect data from the UAVs, as it will be described in detail herein after.

According to the present invention, a tracking system is provided to track the movement of moving entities, as exemplarily represented in FIG. 1, the tracking system comprising a tracking device configured to move together with the moving entity and a detection module configured to perform a detection process, as it will be further described herein after. According to some embodiments of the invention, the detection module is comprised in the tracking device, in particular in a first processing module of the tracking device. According to other embodiments, the detection module may be provided at another location provided with processing capabilities for performing a detection process such as, for example, at the control station. According to further embodiments, a detection module may be provided either in the tracking device on board the moving entity and at another location such as the control station.

Figure 2:
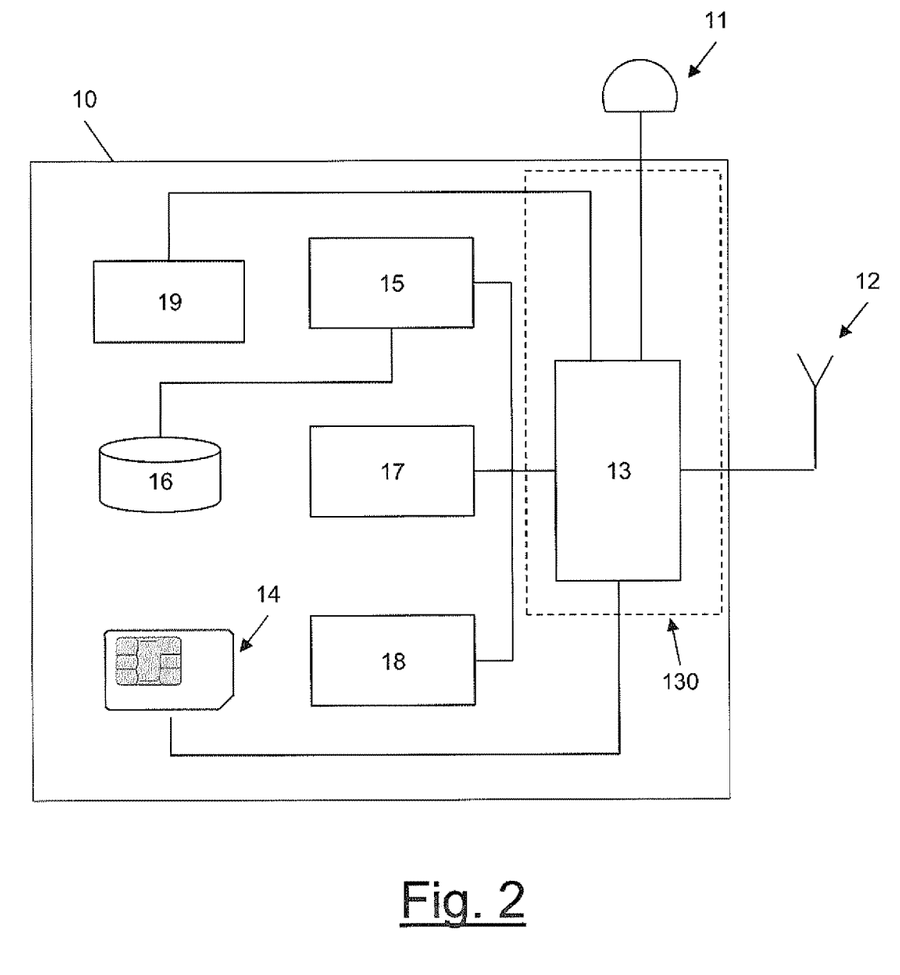
FIG. 2 is a block scheme of a tracking device according to the present invention.

As anticipated above, the tracking device of the present invention is preferably configured to move together with the moving entity. In particular, according to the present invention, each UAV in the scenario described above is equipped with a respective tracking device 10, which is schematically represented in FIG. 2. The other entities (namely, in particular, the base stations of the mobile communication network, the control station, the satellites of the GNSS and, possibly, the gateways) are preferably equipped with modules, in particular, hardware and/or software modules, configured to provide the capabilities to transmit and receive data to/from the UAVs, as it will be described herein after. Moreover, as cited above, the scenario also comprises a number of service providers which are collecting data and offering—over the Internet—free or paid information services to support the navigation.

FIG. 2 is a block scheme of the tracking device 10 that is mounted on the UAV to be tracked according to embodiments of the present invention. The tracking device 10 represented in FIG. 2 preferably comprises:

- a communication module 130 enabling the tracking device 10 to connect with a mobile communication network and/or with the GNSS. The communication module 130 preferably comprises connection(s) to one or more antennas. In particular, the communication module 130 may comprise: a connection to a first antenna 11 configured to transmit and receive signals to/from the GNSS satellites, and/or a connection to a second antenna 12 configured to transmit and receive signals within the mobile communication network. The communication module 130 preferably also comprises a transceiver 13 connected to the one or more antennas and configured to manage the operation of the antennas and the connectivity with, in particular, the mobile communication network. The transceiver 13 preferably comprises a modem;
- a subscriber identity module (SIM) 14 storing at least one SIM identifier, such as the International Mobile Subscriber Identity (IMSI), for the device identification when establishing the connectivity with the mobile communication network. The subscriber identity module may be implemented as a stand-alone SIM card, as schematically represented in FIG. 2, possibly installed and connected via a SIM slot, or as an embedded SIM (eSIM);
- a first processing module 15 comprising a detection module configured to detect an anomaly, as it will be described herein after; the first processing module 15 is preferably connected to a storage unit 16;
- a second processing module 17 configured to issue an alert message to be sent to the control station 3 via the communication module 130 and the mobile communication network in case an anomaly is detected;
- optionally, a third processing module 18 configured to encrypt/decrypt the data exchanged between the tracking device 10 mounted on the UAV and any one of the other entities of the exemplary scenario that is taken into consideration (namely, in the scenario of FIG. 1, another UAV, the base stations, the satellites, the control station and possibly the gateways);
- a controller 19, for instance a microcontroller (MCU), configured to manage any sensors and/or any actuators present on board the UAV.

The UAV may comprise a number of sensors (not shown in the Figures), which preferably comprise sensors for collecting data indicating environmental conditions and/or the status of engines and mechanical parts of the UAV. Examples of sensors are: GPS sensors, pressure sensors, humidity sensors, temperature sensors, imaging sensors, etc. Besides, the UAV may comprise a camera.

Moreover, the UAV preferably comprises a number of actuators (not shown in the Figures) for actuating commands locally stored on board the UAV or for actuating commands sent by remote operators via the mobile communication network. For example, the UAV may comprise actuators used to control the movement of the UAV. Examples of such actuators are actuators commonly used to move flight and altitude control surfaces on UAVs, such as the elevator, ailerons, flaps and nose wheel.

The tracking device 10 described herein above may be implemented as a micro-computing unit on board the UAV. The processing modules described herein above are preferably software modules or modules resulting from a combination of software and hardware components.

The tracking device 10 according to the present invention preferably also comprises a supply unit such as a battery (not shown in the Figures), to provide power to the components of the tracking device 10.

The tracking device 10 is preferably configured to receive a signal from the GNSS (through the first antenna 11) and/or from the mobile communication network (through the second antenna 12) and to determine data associated with the movement of the related UAV. In particular, the tracking device 10 is configured to determine position data associated with the movement of the related UAV, namely the actual position coordinates $(x_a, y_a, z_a)$ of the related UAV. The actual position coordinates of the UAV are preferably determined with a given sampling frequency. The sampling frequency may be of a few Hertz, e.g. a value comprised between 1 Hz and 10 Hz. The actual position coordinates may be determined by processing the signal received from the GNSS or from a Radio Positioning System (RPS) based on the mobile communication network. In the former case, for instance, the actual position coordinates are preferably determined at a GNSS (e.g. GPS) receiver located in the communication module by capturing the signal of the satellites through the first antenna 11. The method used to compute the actual position coordinated based on a GNSS (e.g. GPS) signal is known and will not be further described herein after. In the latter case, the actual position coordinates are preferably determined at the transceiver 13 of the communication module by capturing a radio positioning signal transmitted by the base stations of the mobile communication network through the second antenna 12. Also in this case, the method used to compute the actual position coordinated based on a RPS signal is known and will not be further described herein after.

According to embodiments of the present invention, the signal received by the tracking device 10 from the GNSS or the mobile communication network is encrypted. In this case, the tracking device 10 is preferably configured to decrypt the signal before any processing thereof, as it will be described in greater detail herein after.

The actual position coordinates determined at the tracking device 10 are then stored in the storage unit 16.

The first processing module 15 comprises a detection module that is preferably configured to detect an anomaly in the position of the UAV by implementing a detection process, in particular a detection process comprising a detection algorithm based on an artificial intelligence (AI) algorithm, more in particular based on a Machine Learning (ML) algorithm. Even more in particular, the ML algorithm implemented at the first processing unit 15 is a supervised learning algorithm based on a convolutional neural network (CNN). The convolutional neural network is preferably a 1-dimension convolutional neural network (1D CNN). Moreover, the first processing module 15 may be configured to detect any potential data loss (namely any loss of the position coordinates of the UAV due to e.g. a fault) and/or any data corruption (which can be malicious or accidental).

The third processing module 18 is preferably configured to encrypt/decrypt the data exchanged between the tracking device 10 mounted on the UAV and any one of the entities of the exemplary scenario that is taken into consideration (namely, in the scenario of FIG. 1, another UAV, the base stations, the satellites, the control station and, possibly, the gateways) through the mobile communication network or through the sensors on board the UAV. Data may comprise, in particular, the signal received in real time by a GPS sensor on board the UAV, the signal received by the transceiver from the base stations and the data gathered by the other sensors on board. A cryptographic method is used to secure communications and data exchanges and is preferably a quantum method, more preferably a Quantum Key Distribution (QKD) method or a method based on the use of a Quantum Random Number Generator (QRNG).

The known Quantum Key Distribution (QKD) method enables the two parties involved in the communication (namely, the UAV on which the tracking device 10 is mounted and, for instance, the control station 3 or a base station of the mobile communication network) to produce and share a random secret key that they can use to encrypt and decrypt the exchanged messages.

Advantageously, the security of QKD relies on fundamental laws of quantum physics, and therefore QKD transmission is less vulnerable against eavesdroppers. In fact, the act of measuring a quantum system disturbs the system: an eavesdropper trying to intercept a quantum exchange will inevitably leave detectable traces; in that case, the parties can decide either to discard the corrupted information or reduce the information available to the eavesdropper.

Alternatively, the third processing module 18 may comprise a Quantum Random Number Generator (QRNG). As known, a QRNG is based on quantum technologies for the generation of a random and unpredictable key to be used to encrypt the data to be exchanged between the tracking device 10 and the other entities of the scenario represented in FIG. 1. It is to be noticed that, as known, a possible device used as a QRNG may be the camera of the UAV. In this case, the camera may cooperate with the third processing module 18 to perform encryption of the data.

A skilled person will notice that, according to these embodiments of the invention, corresponding modules configured to encrypt/decrypt data according to the cryptographic method mentioned above are installed on the other entities exchanging data with the tracking system. In the exemplary scenario that is taken into consideration in FIG. 1 these other entities are the other UAVs, the base stations, the satellites, the control station and, possibly, the gateways.

Figure 3:
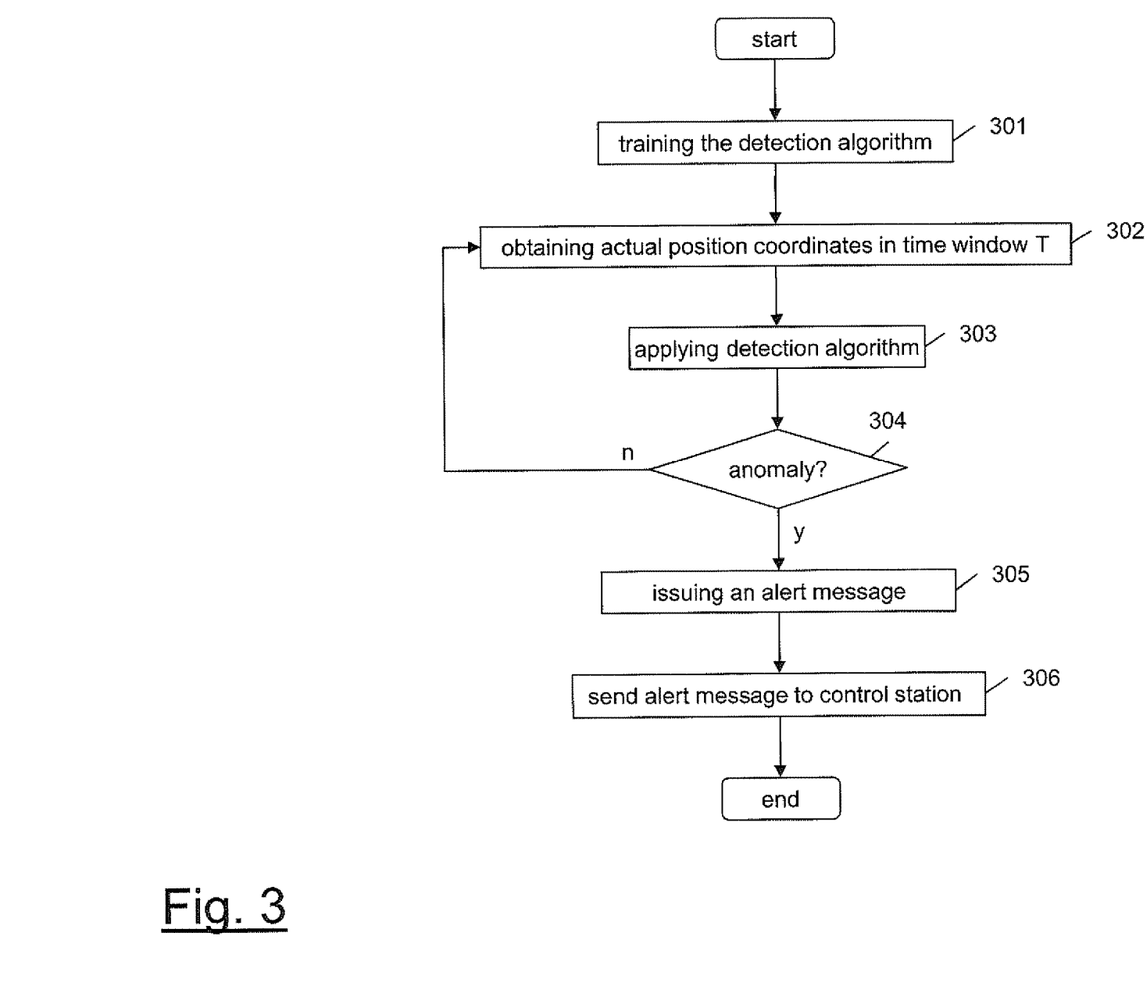
FIG. 3 is a flowchart of the method for tracking a moving entity according to the present invention.

FIG. 3 is a flowchart of a method for tracking a moving entity according to the present invention. For sake of non-limiting example, the following description will be referred to the operation of a tracking system in which the tracking device comprises a first processing module in turn comprising a detection module on board the UAV.

Before the UAV is operated to detect its position, the method provides for performing a procedure for training the detection algorithm (step 301). Once the detection algorithm is trained and tested, as it will be described in detail herein after, it may be used during the operation of the UAV to detect its position. In particular, at step 302, the tracking device 10 preferably provides the actual position coordinates of the UAV by determining them from the GNSS signal or from an RPS signal based on the mobile communication network. The actual position coordinates of the UAV are preferably determined with a given frequency F (which may be of a few Hertz) within a time window of duration T, for instance of a few seconds or minutes. It is assumed that an expected route of the UAV is known, whose coordinates are preferably stored in the storage unit 16. When the actual position coordinates are made available, an array of error data is preferably derived from a computation performed by the first processing module 15, namely the computation of the difference between the actual position coordinates that are sampled within the time window T and the corresponding expected position coordinates, namely the samples of the expected position coordinates within the same time window during the operation of the UAV. Then, the array of error data is preferably processed by the first processing module 15 that applies the detection algorithm (step 303) and classifies the actual position coordinates of the time window T accordingly. At this point, preferably, the first processing module 15 checks the output of the detection algorithm and verifies whether an anomaly in the position of the UAV is detected (step 304). In case this check is negative, no action is taken. The method continues by checking the position of the UAV in a subsequent time window (step 302). It is to be noticed that an anomaly can be detected in case the actual position coordinates of the UAV do not match the expected position coordinates, but also in case the actual position coordinates are lost and in case the actual position coordinates have been corrupted, as it will be clear by the following description.

In case an anomaly is detected, the second processing module 17 preferably issues an alert message (step 305). The alert message is then sent, through the second antenna 12 and the mobile communication network, to the control station 3 (step 306), which preferably processes its content. The alert message may be encrypted by the third processing module 18 before being sent to the control station 3. In this case, the control station 3, upon reception of the encrypted alert message, preferably decrypts the encrypted alert message and processes its content. Then, the control station 3 then may take appropriate actions. For instance, the control station 3 may send a command to the UAV for adjusting its route. In this case, such a command is processed by the controller 19 which may operate the appropriate actuator(s) on board the UAV.

In the following description, some of the steps of the method described above will be considered in more detail, in particular the step of training the detection algorithm.

As mentioned above, according to the embodiments of the invention described above, the first processing module 15 is configured to perform a method for training the detection algorithm. Training the detection algorithm is performed before the detection algorithm is actually used to detect an anomaly in the position of the UAV, by using previously collected flight data, namely previously collected position coordinates of the UAV. The flight data used for training the detection algorithm may be collected during initial flight. Then, the training process is continuous, that is, after the initial training, it can also continue with data from subsequent flights. This advantageously allows to continuously populate the database with data related to possible anomalous patterns.

The actual position coordinates are elaborated starting from signals that are received at the communication module from the GNSS or the RPS, as already described above. The position coordinates used for training the detection algorithm will be referred to as "actual training position coordinates".

Figure 4:
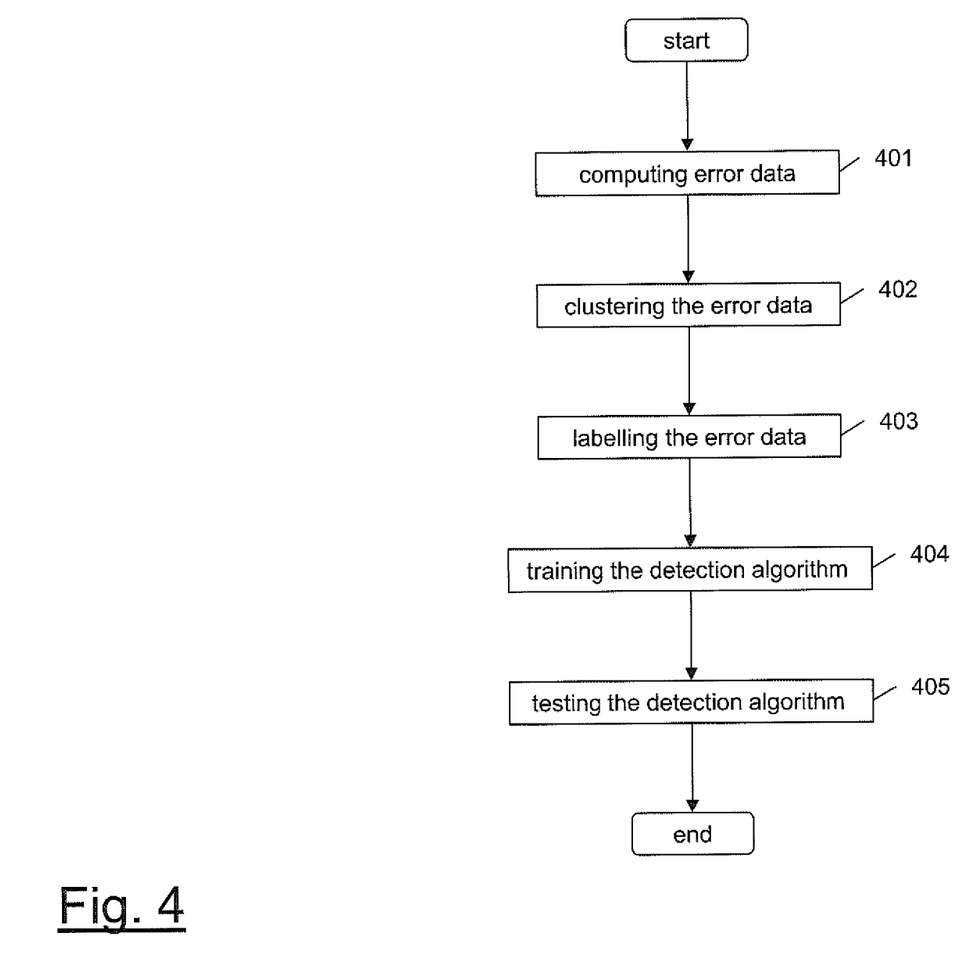
FIG. 4 is a flowchart of the steps of the method for training a detection algorithm implemented at the tracking device of FIG. 2.

The method used for training the detection algorithm according to the present invention is represented in the flowchart shown in FIG. 4.

As already mentioned above, it is assumed that an expected route of the UAV is known. The time-varying coordinates $x_e(t)$, $y_e(t)$, $z_e(t)$ of the expected position of the UAV along the expected route are preferably stored in the storage unit 16.

The first step 401 of the method for training the detection algorithm preferably comprises computing a difference between the actual training position of the UAV and the expected position of the UAV. The difference between the actual training position and the expected position of the UAV is preferably computed within a number M of predetermined time windows of duration T, where M is an integer number higher than 1. The duration T of each time window may be of about a few or tens of seconds (e.g. 5 seconds) or minutes. During each time window, the computation of the difference between the actual training position and the expected position is performed at discrete sampling times with a given frequency F. The frequency F may be of a few Hertz, for instance equal to a value comprised between 1 Hz and 10 Hz. In particular, within each time window, step 401 comprises computing a number $N=T \times F$ of the following three error data:

$$x(i) = x_a(i) - x_e(i);$$
$$y(i) = y_a(i) - y_e(i);$$
$$z(i) = z_a(i) - z_e(i);$$

where $i=1, 2, \ldots, N$, $x_a(i)$ is the value of the x-coordinate of the actual training position of the UAV, which is obtained at a sampling time $t(i)$ within the considered time window; $y_a(i)$ is the corresponding value of the y-coordinate of the actual training position of the UAV; and $z_a(i)$ is the corresponding value of the z-coordinate of the actual training position of the UAV; on the other side, $x_e(i)$ is a value of the x-coordinate of the expected position of the UAV considered at the same sampling time $t(i)$; $y_e(i)$ is the corresponding value of the y-coordinate of the expected position of the UAV; and $z_e(i)$ is the corresponding value of the z-coordinate of the expected position of the UAV.

For each time window, a corresponding set or array of $3 \times N$ error data is hence preferably computed, namely three error data (on the x, y and z coordinate of the UAV position) per each sampling time. All the computed arrays of error data constitute the dataset used for training the detection algorithm.

Once the error data are computed for all the considered time windows, a clustering algorithm is preferably applied (step 402) for the purpose of labeling the computed error data of any considered time window. For instance, the clustering algorithm may be the known K-means algorithm. In particular, applying the clustering algorithm comprises grouping the arrays of error data associated with the different time windows into a number of classes on the basis of one or more given similarity parameters and/or distance metrics. One metric may be for instance the distance between the actual training position and the expected position of the UAV.

Then, at step 403, each array of error data of the computed dataset is labelled, namely associated with a given class indicating a type of behavior of the UAV in the considered time window. For example, labelling the arrays of error data may comprise associating each array with one of three different classes: normal, anomaly and uncertain. The "normal" class may include all the arrays of error data which are showing a normal behavior of the UAV, for example error data below a certain threshold. The "anomaly" class may include all the arrays of error data which are showing a potential anomaly in the behavior of the UAV due to, for instance, hijacking or data loss. The anomaly class may include arrays of error data that are above a certain threshold. The "uncertain" class may include all the arrays of error data which are not classifiable in any one of the above two classes.

Once the arrays of error data of the dataset are labelled, the labelled dataset is preferably subdivided into a first subset of labelled arrays of error data and a second subset of labelled arrays of error data. The partition of the arrays of error data between the first subset and the second subset is preferably performed in a random manner. Preferably, the first subset is used to train the detection algorithm (step 404), while the second subset is then preferably used for testing the detection algorithm (step 405) at the end of the training phase.

As already mentioned above, once the detection algorithm is trained and tested, it may be applied on the field to detect an anomaly in the behavior of the UAV. In particular, within a given time window during the operation of the UAV after the detection algorithm has been trained and tested, an array of error data is computed by comparing the actual position of the UAV with the expected position stored in the storage unit 16. The array of error data is then processed as input by the detection algorithm. Then, an anomaly is detected when the detection algorithm classifies the input array of error data in the "anomaly" class.

When an anomaly is detected by the first processing module 15, the second processing module 17 preferably issues an alert message, which is sent, through the second antenna 12 and the mobile communication network, to the control station 3. The alert message may be encrypted by the third processing module 18 before being sent to the control station 3, by using a cryptographic method as mentioned above. In this case, the control station 3 preferably decrypts the encrypted alert message and then processes its content. The control station 3 at this point may take appropriate actions. For instance, the control station 3 may send a command to the UAV for changing its route. Preferably also this command can be encrypted by using a cryptographic method, in particular one of the cryptographic methods mentioned above.

In this case, the command is received and processed, and, if necessary, decrypted, by the tracking device 10. In particular, the controller 19 may operate appropriate actuator(s) to change the route of the UAV, and possibly to update the expected position coordinates that are stored in the storage unit 16.

As already anticipated, it is to be noticed that the operations of training and executing the detection algorithm may be performed by the tracking device on board the UAV, as described above, or, according to other embodiments, at a detection module located at the control station or at another location provided with processing capabilities for executing the detection algorithm. In case these operations are performed at the control station or at another location, the actual position coordinates of the UAV are preferably sent by the UAV to the location of the detection module (e.g. the control station) via the mobile communication network, and they can be encrypted by using one of the cryptographic methods described above.

The functioning of the exemplary 1D CNN mentioned above is described in detail herein below. Input data is in the form of a 3N data vector that is passed into the input layer of the CNN. The input data vector contains a number N of the three error data $x(i)$, $y(i)$, and $z(i)$, $i=1, 2, \ldots, N$, i.e. three error data per each sampling time, mentioned above. If the data are sampled at 10 Hz in a time window of 5 seconds, the number N is 50. The first layer in the network reshapes the vector into a N×3 matrix (i.e. comprising N rows and 3 columns). The first layer of the CNN defines a filter (also called "feature detector") of height W (also called kernel size), W being an integer number higher than 1. A filter is a matrix of a few lines and columns representing a feature to be recognized. The columns comprise the error data, e.g. the values $x(i)$, $y(i)$, and $z(i)$, $i=1, 2, \ldots, N$. Therefore, if only the error data on the position are considered, the filter matrix comprises three columns. If, in addition to the error data on the position, the error data on, e.g., the speed would be considered, the filter matrix would comprise six columns. The number of lines of the filter matrix is W, which may be equal to, for instance, 10. According to the example described above where N=50, applying the filter matrix corresponds to scrolling vertically, along the 50×3 matrix, a window with a height of W=10 rows and a width of 3 columns for 41 steps.

It is to be noticed that defining one filter would allow the CNN to learn one single feature of the input data. As known, in machine learning, a feature is an individual measurable property or characteristic of a phenomenon being observed. According to the present invention, a feature may correspond to an anomalous behavior of the UAV. As this might not be sufficient, a number NF of filters (e.g., NF=100) of kernel size W is preferably defined. This allows to train the CNN to learn NF different features of the input data. The output of the first CNN layer is a (N−W+1)×NF matrix (i.e., a matrix with N−W+1 rows and NF columns). According to the example described above where N=50 and W=10, this matrix is a 41×100 matrix. Each column of the output matrix contains the N−W+1 weights of one filter. The outputs from the first convolutional layer are fed into the second convolutional layer. Again, NF different filters are defined to be trained on this level. The output matrix is of size ((N−W+1)−W+1)×NF (i.e. a matrix with (N−W+1)−W+1 rows and NF columns).

Then, a pooling layer is preferably used to reduce the complexity of the output and prevent overfitting of the data. In this example, the size of the window is three, which means that the output from three neurons is combined into one neuron, and the pooling layer computes a maximum value from the neurons across a sliding window: the output matrix of this layer is a third of the input matrix, which means a matrix with ((N−W+1)−W+1)/3 rows and NF columns.

Then, after the pooling layer, the CNN may comprise a third and fourth 1D convolutional layers. It is assumed that that at the output of the last convolutional layer the matrix has dimension 2×NF2 where NF2 is an integer number (namely, NF2 is the number of filters in the third and fourth 1D convolutional layers). A further pooling layer is then applied to further avoid overfitting. At the further pooling layer, the average value of two weights within the neural network is considered. The output matrix has a size of 1×NF2 neurons.

Then, preferably, a dropout layer randomly assigns a zero weight to neurons in the network. For example, 50% of the neurons receive a zero weight. This operation makes the network less sensitive to smaller variations in the data. The output of this layer is still a 1×NF2 matrix of neurons.

Finally, a dense layer, i.e. a fully connected layer, e.g. with Softmax activation reduces the vector of height NF2 to a vector of three outputs (i.e., 3 neurons) corresponding to the three classes to be predicted ("anomaly", "normal", "uncertain"). This reduction is done by another matrix multiplication. Softmax is used as activation function forcing the three outputs of the neural network to sum up to one. Each output value therefore represents the probability for a respective class.

In the above description, reference has been made to data related to the movement of the UAV in terms of position data, namely in terms of its x, y, z coordinates. However, the detection algorithm may be configured to operate by using, in addition or in alternative to position data, other types of data, for instance related to the speed of the UAV or to any other indicator associated with the movement of the UAV.

It is to be noticed that according to an embodiment of the present invention, the tracking system can be implemented on a portable device such as a smartphone or tablet or a portable computer, or the like, with storage and processing capabilities to run the detection algorithm. In this case, the camera of the device can be used as a QRNG. The QRNG on board the mobile phone allows secure authentication to a 4G or 5G network and encryption of data transmissions using quantum keys. Therefore, in this way, the tracking system of the present invention can be used to monitor also the movements of humans carrying the cited portable device in a secure way.

The system of the present invention allows a secure exchange of position data and other information of any moving object, which allows improving traffic monitoring and control, collision avoidance, search and rescue operations, and accidents investigations.

Advantageously, the system according to the present invention shows a number of advantages over the AIS. First of all, the AIS is currently used only for maritime traffic monitoring and control, while the system according to the present invention may be used for the traffic monitoring and control of any moving object. Moreover, while AIS operates by using dedicated radio links, the present system uses the radio links of a mobile communication network and hence does not require deploying dedicated network resources. The security vulnerabilities of the AIS are mitigated by the present system by implementing a detection algorithm based on artificial intelligence and possibly, in addition, cryptographic methods for data communication based on secure quantum technologies. Finally, AIS does not provide a centralised alert management while the system of the present invention, advantageously, uses alerts to signal anomalies in the behaviour of the moving object or violations. In this way, a centralized authority is enabled to take adequate actions to react to any data loss and/or data corruption due to unauthorized access and hijacking.

The invention claimed is:

1. A tracking system for tracking movement of a moving object, the tracking system comprising:
   a tracking device comprising a processor, a transceiver, and a controller, wherein the tracking device moves together with the moving object and provides data associated with movement of the moving object, and wherein the processor is configured to:
      based on the data associated with the movement of the moving object, perform a detection process to detect an anomaly in the data, the detection process comprising a machine learning algorithm, wherein the machine learning algorithm is trained by computing a difference between an actual position of the moving object and an expected position of the moving object, for a number of predetermined time windows, and at one or more discrete sampling times,
      in case an anomaly is detected, issue an alert message; and
   using the transceiver, send the alert message to a control station; and
   control, by the control station, in response to receiving the alert message, the movement of the moving object by adjusting a route associated with the moving object.

2. The tracking system according to claim 1, wherein the machine learning algorithm is a supervised learning algorithm.

3. The tracking system according to claim 2, wherein the supervised learning algorithm is based on a one-dimensional convolutional neural network.

4. The tracking system according to claim 1, wherein the transceiver transmits and receives a signal to and from a global navigation satellite system, and determines actual position coordinates of the moving object from the signal received from the global navigation satellite system.

5. The tracking system according to claim 4, wherein the transceiver receives the signal in an encrypted form and the processor is configured to implement a cryptographic method to decrypt the encrypted signal.

6. The tracking system according to claim 5, wherein the cryptographic method is a quantum key distribution algorithm or a method based on a quantum random number generator.

7. The tracking system according to claim 1, wherein the transceiver determines actual position coordinates of the moving object from a signal received from a radio positioning system based on a mobile communication network.

8. The tracking system according to claim 1, wherein the tracking device further comprises a subscriber identity module configured to store at least one SIM identifier for device identification when establishing connectivity with a mobile communication network.

9. The tracking system according to claim 1, wherein the controller is configured to manage one or more sensors and/or one or more actuators on board the moving object.

10. The tracking system according to claim 9, wherein the controller is configured to process a command for managing at least one actuator for adjusting a route of the moving object.

11. The tracking system according to claim 1, wherein the tracking device is located on board the moving object.

12. The system of claim 1, wherein the machine learning algorithm is continuously refined by further training the machine learning algorithm using current flight data associated with the moving object.

13. The system of claim 1, wherein each window of the number of predetermined windows is less than 5 seconds.

14. The system of claim 1, wherein a frequency of performing the training at each of the one or more discrete sampling times is between 1 Hz and 10 Hz.

15. The system of claim 1, wherein error data associated with training the machine learning algorithm is generated as a 3×N array.

16. A tracking device for tracking movement of a moving object, wherein the tracking device moves together with the moving object and comprises a processor, a transceiver, and a controller, wherein the processor is configured to:
   based on data associated with movement of the moving object, perform a detection process to detect an anomaly in the data;
   in case an anomaly is detected, issue an alert message;
   connect the tracking device with a mobile communication network; and
   using the transceiver, send the alert message, via the mobile communication network, to a control station,
   wherein the detection process comprises a machine learning algorithm, wherein the machine learning algorithm is trained by computing a difference between an actual position of the moving object and an expected position of the moving object, for a number of predetermined time windows, and at one or more discrete sampling times; and
   control, by the control station, in response to receiving the alert message, the movement of the moving object by adjusting a route associated with the moving object.

17. A method for tracking movement of a moving object, the method comprising, at a tracking system comprising a tracking device comprising a processor, a transceiver, and a controller, wherein the tracking device moves together with the moving object:
   providing data associated with movement of the moving object;
   performing a detection process to detect an anomaly in the data, the detection process comprising a machine learning algorithm, wherein the machine learning algorithm is trained by computing a difference between an actual position of the moving object and an expected position of the moving object, for a number of predetermined time windows, and at one or more discrete sampling times; and
   in case an anomaly is detected:
      issuing an alert message, by the processor, to be processed at a control station; and
      sending the alert message to the control station using the transceiver, wherein the control station, based on receiving the alert message, controls the movement of the moving object by adjusting a route associated with the movement of the moving object.

18. The method according to claim 17, wherein the machine learning algorithm is a supervised learning algorithm and performing a detection algorithm comprises training the detection algorithm based on a set of error data that are computed as a difference between an actual position of the moving object and an expected position of the moving object.

19. The method according to claim 18, wherein the set of error data comprises a number of arrays of error data, each array being derived from a computation of the error data within a time window of pre-defined duration, and wherein, during each time window, the computation of the difference between the actual position and the expected position is performed at discrete sampling times with a given frequency.

20. The method according to claim 19, wherein the performing a detection algorithm comprises labelling each array of error data by associating it with a given class indicating a type of behavior of the moving object in the time window, wherein one type of behavior indicates an anomaly in the behavior of the moving object.

\* \* \* \* \*